INVENTOR
Hartmut Claus
BY Spencer & Kaye
ATTORNEYS.

INVENTOR
Hartmut Claus

BY Spencer & Kaye

ATTORNEYS.

INVENTOR
Hartmut Claus

BY Spencer & Kaye
ATTORNEYS.

INVENTOR
Hartmut Claus
BY Spencer & Kaye
ATTORNEYS.

INVENTOR
Hartmut Claus

BY Spencer & Kaye
ATTORNEYS

United States Patent Office 3,737,403
Patented June 5, 1973

3,737,403
ELECTRIC SWITCH MATERIAL BASED ON A BLEND OF THREE EPOXY COMPONENTS

Hartmut Claus, Regensburg, Germany, assignor to Sachsenwerk Licht- und Kraft-Aktiengesellschaft, Munich, Germany Continuation-in-part of abandoned application Ser. No. 883,250, Dec. 8, 1969. This application Dec. 18, 1970, Ser. No. 99,424
Claims priority, application Germany, Dec. 6, 1968, P 18 17 698.2
Int. Cl. C08g *51/04*
U.S. Cl. 260—37 EP 2 Claims

ABSTRACT OF THE DISCLOSURE

A castable material formed from a mixture of cycloaliphatic and aromatic epoxy resins with an agent for increasing gas evolution upon heating. This material is useful for constructing structural members of an arc-extinguishing chamber in an electrical switch.

CROSS-REFERENCES TO RELATED APPLICATIONS

This is a continuation-in-part application to my application Ser. No. 883,250, filed Dec. 8, 1969, now abandoned, for an "Electric Switch Material."

BACKGROUND OF THE INVENTION

The present invention relates to a casting plastic that emits gas upon being heated. This material is particularly suitable as a structural material for arc-extinguishing chambers in electric switches.

The parts of an arc-extinguishing chamber in an electrical switch that are contacted by the arc during switch operation experience high mechanical and electrical loading. Furthermore, the arc itself concentrates its energy into physically limited regions and this leads to especially severe thermal loading.

It is known to make arc-extinguishing chambers from cycloaliphatic and aliphatic, hardenable epoxy resins. These resins exhibit good arc-extinguishing and electrically insulating properties. In order to reinforce the arc-extinguishing effect, it is furthermore known to add to these resins a filler that gives off an arc-extinguishing gas. However, the presence of such fillers reduces the mechanical strength of these resins and, since their mechanical strength is not high to begin with, this is a very noticeable disadvantage.

The aromatic epoxy resins exhibit better mechanical properties, but until now such have not been used for arc-extinguishing chamber construction, because they result in carbon deposits in the chamber due to their pyrolytic decomposition. This carbon significantly decreases insulating ability and extinguishing effect as it builds up during repeated switchings. The problem is especially critical for high voltage switches, where the carbon, even if not constituting a complete short circuit, can present a path for arcing between the open contacts.

There is known a load-disconnecting switch combining a swinging knife and an arc-extinguishing device made of material which releases gas on being heated. A spring-energy-storing arcing blade is pivotably connected to the swinging knife and is actually responsible for breaking the current. This arcing blade lies between two arc-extinguishing jaws arranged in hollowed-out supports. Those parts of the jaws that are subjected most to the arc are made of a material exhibiting especially good arc-extinguishing characteristics as compared with the remainder of the jaws, which remainder exhibits a high mechanical strength and low gas-evolving ability.

The jaws of this last-described switch leave nothing to be desired as far as permanence and arc-extinguishing performance are concerned. However, the manufacture of such jaws is complicated and thus expensive. One problem is the bonding of small plates in recesses.

SUMMARY OF THE INVENTION

An object of the invention therefore is to provide a material suitable for use in arc-extinguishing chambers in electrical switches that avoids the above-listed disadvantages of the prior art.

This, as well as other objects which will become apparent in the discussion that follows, are achieved, according to the present invention by a casting plastic formed of a mixture of cycloaliphatic and aromatic epoxy resins with a filler for increasing gas evolution, such as melamine and/or aluminum hydroxide (alumina trihydrate). Such casting plastics have shown in tests excellent mechanical and thermal strength and good arc-extinguishing characteristics. The carbon deposits found with aromatic epoxy resins do not occur.

DESCRIPTION OF THE PRFERRED EMBODIMENTS

The following tests are presented for comparison with the results of the present invention. All quantities of compounds are given in parts by weight.

Test I

The following composition is formed into an arc-extinguishing jaw: 100 parts of araldite resin B, type 200/2306 of Ciba Products Corporation, Basel, Switzerland, are mixed with 75 parts of type HT 907 hardener, 12 parts of Dy 065 as accelerator, and 66 parts of melamine as filler. The mechanical strength and gas evolution of this material was good. Sooting was undesirably high.

Test II

The following composition is formed into arc-extinguishing jaws: 100 parts of Lekutherm LK 2159 (x100) epoxy resin of Farbenfabriken Bayer AG, Leverkusen, Germany, 80 parts of hexahydrophthalic acid anhydride as hardener, 1.8 parts of Desmorapid as accelerator, and 42 parts of melamine as filler. The jaws of this composition proved to be too brittle. The extinguishing of the arc was good, but the jaws tended to burn away too strongly.

Test III

The following composition is formed into arc-extinguishing jaws: 10 parts of NC 53 epoxy resin of the Minnesota Mining and Manufacturing Company, 70 parts of Lekutherm LK 2159 (x100) epoxy resin, 80 parts of hexahydrophthalic acid anhydride as hardener, and 60 parts of melamine as filler. This material was basically suited for use as arc-extinguishing jaws. Its soot development was, however, too high and this caused premature current conduction upon switching on.

Test IV

The following composition is formed into arc-extinguishing jaws: 100 parts of Gft Cy 111 epoxy resin of Rütgerswerke und Teerverwertungs—A.G., Frankfurt am Main, Germany, 60 parts of hexahydrophthalic acid anhydride as hardener, 1 part Desmorapid as accelerator, and 53 parts of melamine as filler. The experimental evaluation of these jaws had to be discontinued, since the mechanical properties of the material were not adequate.

It has been surprisingly discovered that a mixture of cycloaliphatic epoxy resin with elastic, aromatic epoxy resin of the type set forth in U.S. Pat. No. 3,316,323, issued Apr. 25, 1967, to Hans Wille and Karl Jellinek for "Elastic Molded Pieces and Coatings From Epexy Resins" yields arc-extinguishing jaws which are exceptionally successful in achieving the objects of the present invention. U.S. Pat. No. 3,316,323 is incorporated here by reference. Example I is the presently referred example. All parts are parts by weight unless noted otherwise.

EXAMPLE I

Seventy parts of the glycidic ester of hexahydrophthalic acid,

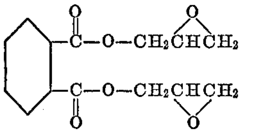

(1)

as provided by Farbenfabriken Bayer AG, Leverkusen, Germany, under the trademark Lekutherm LK 2159 (x100), and 30 parts of a mixture sold under the trademark Rütapox Gft–0275 by Rütgerswerke and Teerverwertung A.G., Frankfurt am Main, Germany, are preheated and mixed together at a temperature of 60 to 70° C.

Figure 13:
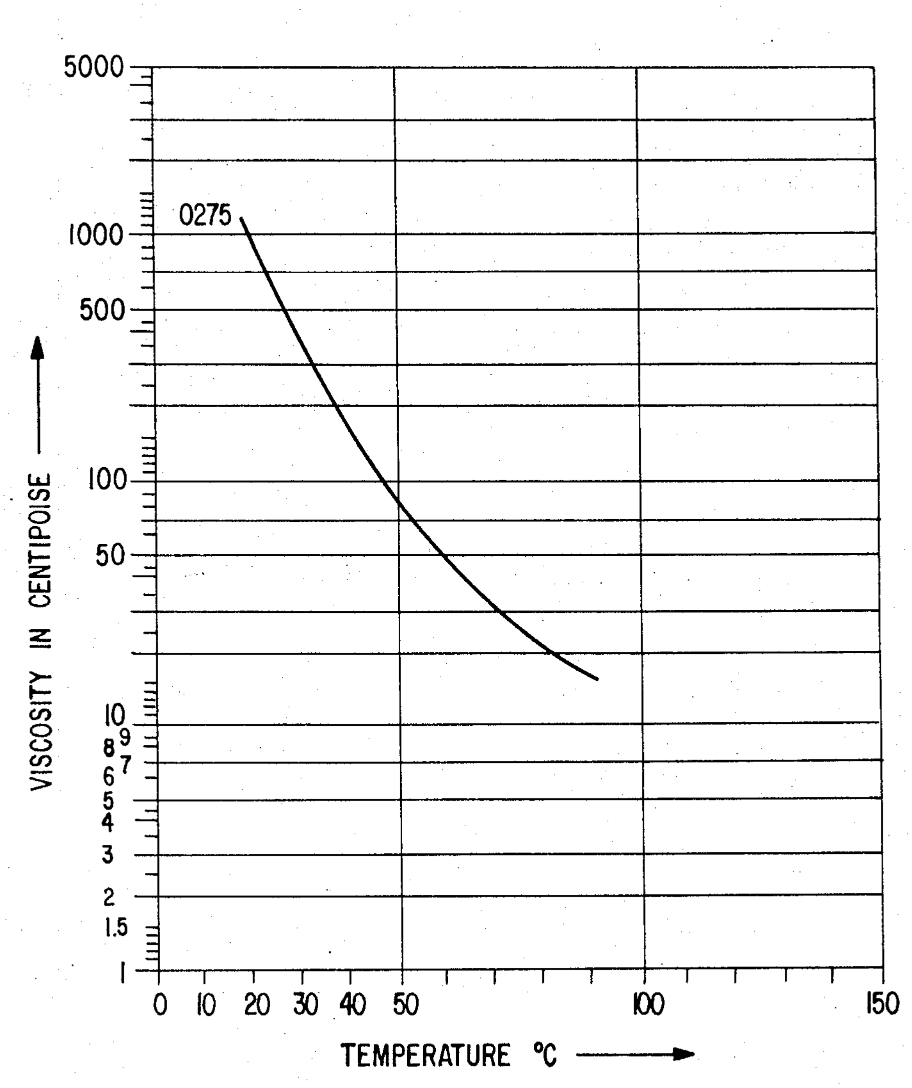
FIG. 13 is a graph of viscosity versus temperature.

Rütapox Gft–0275 is a liquid and has a viscosity-temperature curve as illustrated in FIG. 13 where cp. stands for centipoise. Its epoxide index is 16.0–16.5%, its epoxide equivalent is 259–266 grams per equivalent, and its epoxide value is 0.38–0.39 equivalent per 100 grams. Its color according to Gardner is 5–9, its density at 20° C. is 1.15 grams/milliliter, and its index of refraction $n_D^{25}$ is $1.5145 \pm 0.0010$. Its total chlorine content is less than 1.2% by weight, while its hydrolyzable chlorine content is less than 0.05% by weight. Its pot life is 140–160 minutes after being mixed with triethylenetetramine. Starting with 50 grams of Rütapox Gft–0275 and mixing it with triethylenetetramine, the maximum temperature to be expected is 100–115° C. Rütapox Gft–0275 can be stored at 20° C. in closed containers for at least one year without loss of its properties..

Rütapox Gft–0275 is a physical mixture of 50% by weight bisphenol epoxy resin.

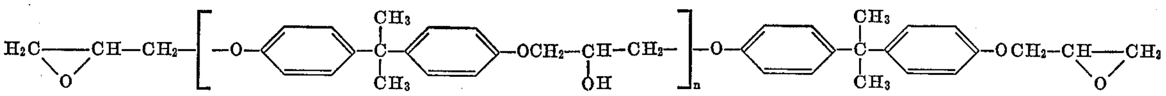

(2)

and 50% by weight poly-(1,2-dimethylethyleneglycol)-diglycidylether having the general formula

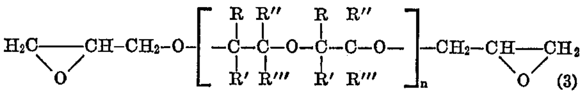

(3)

as set forth in U.S. Pat. No. 3,316,323, issued Apr. 25, 1967 to Hans Wille and Karl Jellinek.

As a next step the following ingredients are preheated also to the temperature range 60 to 70° C. and mixed into the mixture of the substance of Formula I and Rütapox Gft–0275: 71 parts by weight of hexahydrophthalic acid anhydride, $C_8H_{10}O_3$, as hardener, 30 parts by weight of melamine,

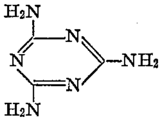

(4)

and 60 parts by weight alumina trihydrate, $Al_2O_3 \cdot 3H_2O$, one part being here the same unit of weight used in making the mixture of the substance of Formula 1 and Rütapox Gft–0275. The resulting mixture is liquid at around 60 to 70° C. and may thus be cast into a form, where it sets into a desired shape.

Curing is accomplished by the following heat treatment: 100° C. for sixty minutes followed by 120° C. for 180 minutes.

The castable plastic that is obtained by the process of this example may be thought of, technically speaking, as an epoxy resin system obtained by the hardening of a mixture of the glycidic ester of hexahydrophthalic acid with bisphenol epoxy resin having ether oxygen in its chains. This hardened mixture contains fillers such as melamine and/or alumina trihydrate and poly-(1,2-dimethylethyleneglycol)-diglycidylether as a flexibilizing agent. This castable plastic is useful, due to its electrical insulating and gas-evolving properties, as a building material for arc-extinguishing chambers or arc-extinguishing jaws.

The weight ratio of Rütapox Gft–0275 to the substance of Formula 1, i.e. the weight ratio of elastic aromatic epoxy resin to cycloaliphatic epoxy resin, in the plastic of the present invention, exclusive of hardener, may preferably range between 35 to 65 and 25 to 75. Thus, for example, the weight ratio for the above example is 30/70.

While the above Example I is the preferred example of the invention, the following examples are considered to be within its broader scope:

EXAMPLE II

The procedure of Example I, except that the 30 parts of Rütapox Gft–0275 are replaced by a mixture in the proportions of 70 parts by weight of 4,4'-dihydroxydiphenyldimethylmethanediglycidylether having an epoxide-equivalent of 186 and 30 parts by weight of a poly-(1,2-dimethylethyleneglycol)-diglycidylether having an average molecular weight of 600, and the quantity of hardener, is adjusted to provide, for example, ½ of a hexahydrophthalic acid anhydride molecular for every

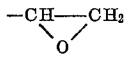

group.

EXAMPLE III

The procedure of Example I, except that the 30 parts of Rütapox Gft–0275 are replaced by a mixture in the proportions of 50 parts by weight of 4,4'-dihydroxydiphenyldimethylmethanediglycidylether having an epoxide-equivalent of 186 and 50 parts by weight of a poly-(1,2-dimethylethyleneglycol)-diglycidylether having an average molecular weight of 400, and the quantity of hardener is adjusted to provide, for example, ½ of a hexahydrophthalic acid anhydride molecule for every

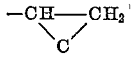

group.

EXAMPLE IV

The procedure of Example I, except that the 30 parts of Rütapox Gft–0275 are replaced by a mixture in the proportion of 80 parts by weight of 4,4'-dihydroxydiphenyldimethylmethanediglycidylether having an epoxide-equivalent of 186 and 20 parts by weight of poly-(1,2-dimethylethyleneglycol)-diglycidylether (having an average molecular weight of 600), and the quantity of hardener is adjusted to provide, for example, ½ of a hexahydrophthalic acid anhydride molecule for every

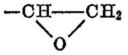

group.

EXAMPLE V

The procedure of Example I, except that the 30 parts of Rütapox Gft–0275 are replaced by a mixture in the proportions of 50 parts by weight of 4,4'-dihydroxydiphenyldimethylmethanediglycidylether having an epoxide-equivalent of 186 and 50 parts by weight of poly-(1-methyl-2-ethylethyleneglycol)-diglycidylether (average molecular weight 800), and the quantity of hardener is adjusted to provide, for example, ½ of a hexahydrophthalic acid anhydride molecule for every

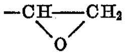

group.

EXAMPLE VI

The procedure of Example I, except that the 30 parts of Rütapox Gft–0275 are replaced by a mixture in the proportions of 50 parts by weight of 4,4'-dihydroxydiphenyldimethylmethanediglycidylether having an epoxide-equivalent of 186 and 50 parts by weight of poly-(1,2-dimethylethyleneglycol)-diglycidylether (having an average molecular weight of 600), and the quantity of hardener is adjusted to provide, for example, ½ of a hexahydrophthalic acid anhydride molecule for every

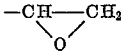

group.

EXAMPLE VII

The procedure of Example I, except that the 30 parts of Rütapox Gft–0275 are replaced by a mixture in the proportions of 60 parts by weight of an epoxydized phenol-novolak having an epoxide equivalent of 174 and an epoxide-group-functionality of 3,4 and 40 parts by weight of poly-(1,2-dimethylethyleneglycol)-diglycidylether (having an average molecular weight of 600), and the quantity of hardener is adjusted to provide, for example, ½ of a hexahydrophthalic acid anhydride molecule for every

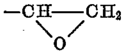

group.

The above Examples II to VII are based on Examples 1 to 6, respectively, of the above-referenced U.S. Pat. No. 3,316,323, and it is incorporated at this location by reference for the purpose of providing definitions of terms appearing in the above Examples II to VII.

EXAMPLE VIII

The procedure of Example I with the addition of 1.8 parts by weight of the substance sold under the trademark of Desmorapid DB by Farbenfabriken Bayer AG, Leverkusen, Germany, as accelerator.

EXAMPLE IX

The procedure of Example I with the addition of 1.8 parts by weight of 2,4,6-tris-(dimethylaminomethylphenol) as accelerator.

EXAMPLE X

The procedure of Example I with the addition of 1.8 parts by weight of benzyldimethylamine as accelerator.

The castable plastic of the present invention is especially advantageous in its simple preparation. There is provided a non-sooting material that evolves gas upon being heated by an arc. This material is especially suitable for the molding of arc-extinguishing jaws. It has been found in practice to meet all requirements of the arc-extinguishing structure of switches concerning mechanical strength, electrical insulation, and gas evolution satisfactorily.

As an example of the use of the plastic of the invention, the plastic is cast in its liquid state into a mold to form arc-extinguishing jaws, one of which is illustrated in detail in FIGS. 1–4. Dimensions are in millimeters. The plastic 1 has solidified about leaf spring 2, which is provided with holes 3 and 4. The plastic bonds through these holes 3 and 4 to form a secure grip on the leaf spring. Additionally embedded in the plastic is an arc-resistant electrically conductive piece 5 which is in conductive contact with the leaf spring 2.

Figure 1:
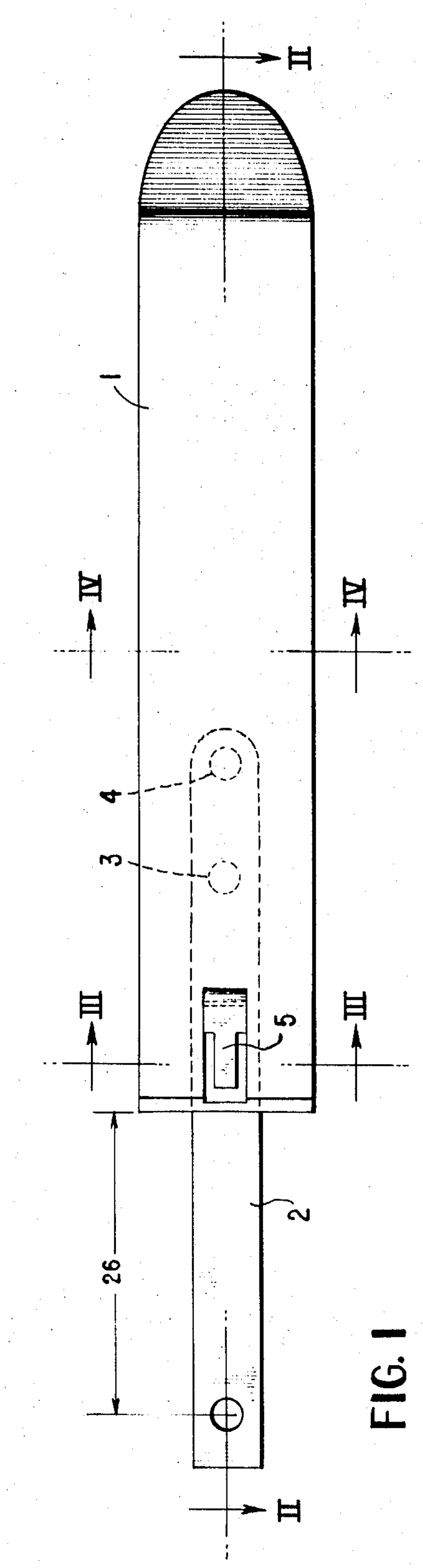
FIG. 1 is a plan view of an arc-extinguishing jaw.
Figure 2:
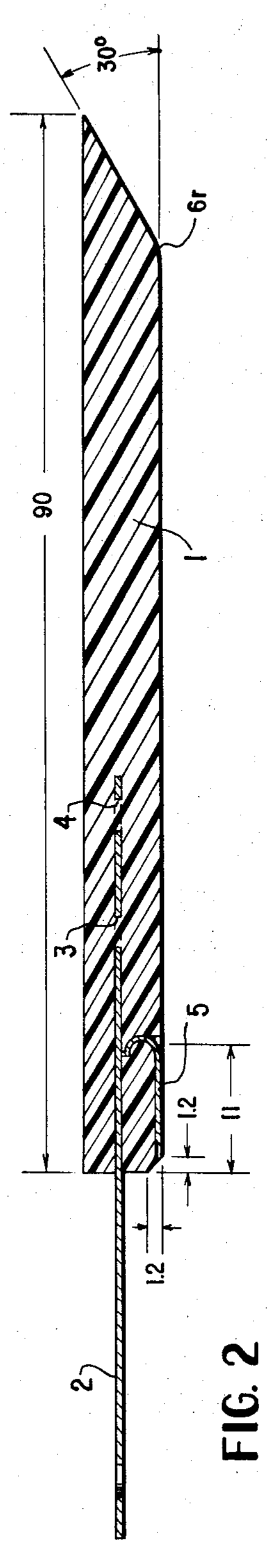
FIG. 2 is a partially sectioned view along the line II—II of FIG. 1.
Figure 4:
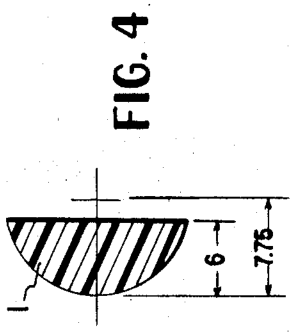
FIG. 4 is a section along the line IV—IV of FIG. 1.
Figure 3:
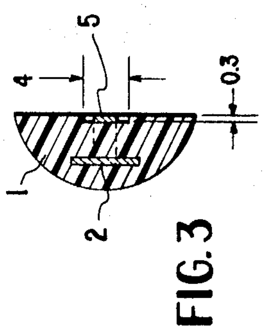
FIG. 3 is a section along the line III—III of FIG. 1.
Figure 5:
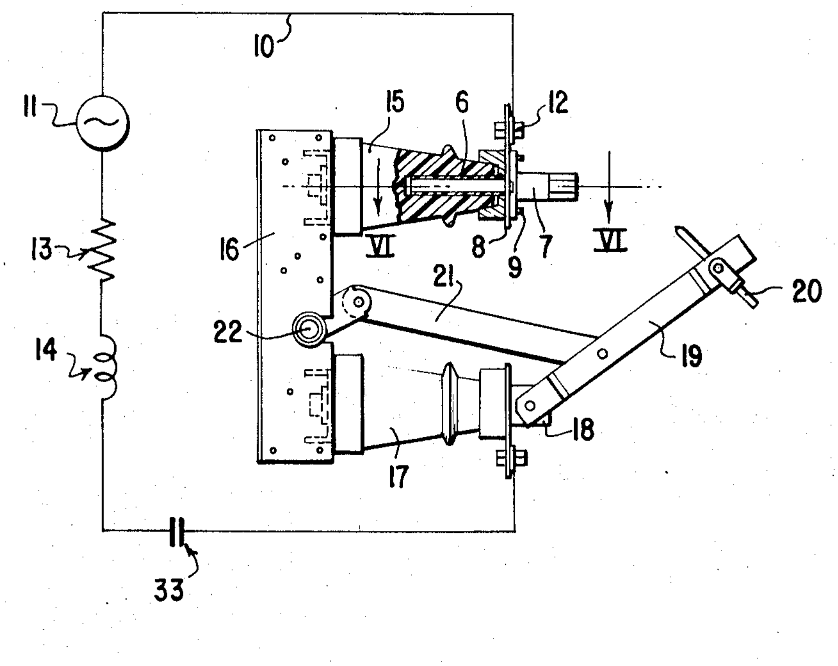
FIG. 5 is a schematic elevation of a switch, partly in cross section.

Such arc-extinguishing jaws are used in pairs in load-breaking knife switches whose essential construction is illustrated schematically in FIG. 5. The arc-extinguishing jaws are contained within housing 6 and this housing is assembled with a main contact 7. The assembly of the pair of arc-extinguishing jaws within the housing 6 will become clear in the description of FIGS. 6–10 which follows. The main contact 7 is fastened in electrically conductive contact to a metal plate 8 by screws 9. The metal plate 8 is carried by way of insulator 15 on frame 16. Cable 10 from a 10 kilovolt power source 11 is connected to metal plate 8 by bolt 12. A generalized load is illustrated by resistor 13, capacitor 33, and inductor 14.

Insulator 17 carries the contact 18 on which the swinging knife 19, in the form of two metal straps running generally parallel in the plane of FIG. 5, is hinged. Arcing blade 20 is pivoted on the free end of the swinging knife 19 and its pivot axis is limitedly free to translate in directions perpendicular to the pivot axis. Thus, the arcing blade can slide into housing 6. Non-conductive push rod 21, which is resistant to surface leakage currents, transmits the operating movement of the switch shaft 22 to the swinging knife 19. The shaft 22 is preferably provided with remote-controlled drive means such as a spring-operated snap-action drive or a compressed air drive to provide rapid and reproducible switching speeds.

Figure 6:
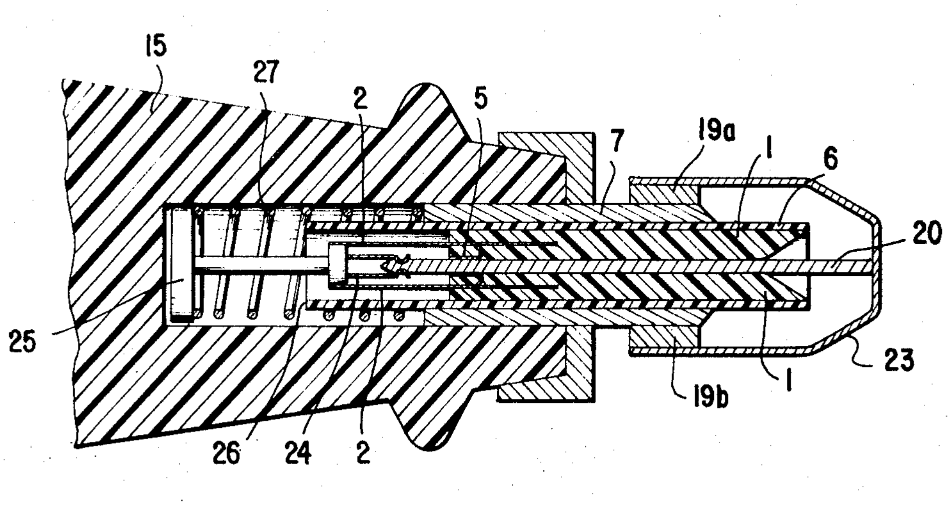
FIG. 6 is a detail of FIG. 5, partly in cross section along the line VI—VI of FIG. 5.

FIG. 6 shows details of FIG. 5. Insulator 15 carries housing 6. The switch is in closed position, straps **19*a* and 19*b* of swinging knife 19 being in conductive contact with main contact 7. The arcing blade 20 is in electrically conductive connection with the swinging knife 19 through yoke 23 and is engaged by the arcing contacts 24, which are in electrically conductive connection with the main contact 7 via spring plate 25 and return spring 27. The arcing contacts 24 are rigidly connected to the spring plate 25 and also, via the leaf springs 2 and the arc-resistant pieces 5, to the pair of arc-extinguishing jaws of plastic 1. The arc-extinguishing jaws are slidable left and right in FIG. 6 relative to housing 6. The travel of the spring plate 25 (and therefore of the arcing contacts 24 and arc-extinguishing jaws also) is limited by the stop 26 formed by the inner end of the housing 6**.

During switching on, the swinging knife 19 rotates counterclockwise in FIG. 5 about its pivot on contact 18. The current path is first established by the contacting of main contact 7 by the swinging knife 19. With continued counterclockwise movement of knife 19, arcing blade 20 makes electrical connection with the arcing contacts 24, until the positioning as shown in FIGS. 6 and 10 is achieved. It will be noted that protrusions of the arcing contacts 24 engage, under spring bias supplied by the arcing contacts themselves, in recesses 30 (see FIG. 9) in the tip of the arcing blade 20.

Figure 7:
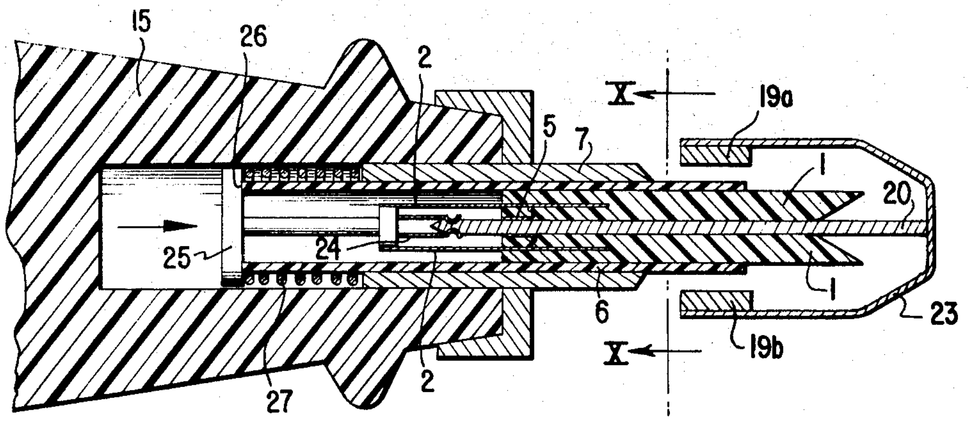
FIGS. 7–9 are schematized versions of FIG. 6, showing certain parts in different positions.

If it is desired to break the electrical circuit, clockwise torque is supplied through shaft 22 in FIG. 5. Straps **19*a* and 19*b* move out of contact with the main contact 7, as shown in FIG. 7. However, the spring-biased engagement of the arcing contacts 24 in the arcing blade 20** is not immediately released. The arc-extinguishing jaws of plastic 1 slide outwards from the housing 6 and the return spring 27 is compressed. Spring plate 25 is shown in FIG. 7 just contacting stop 26.

Figure 8:
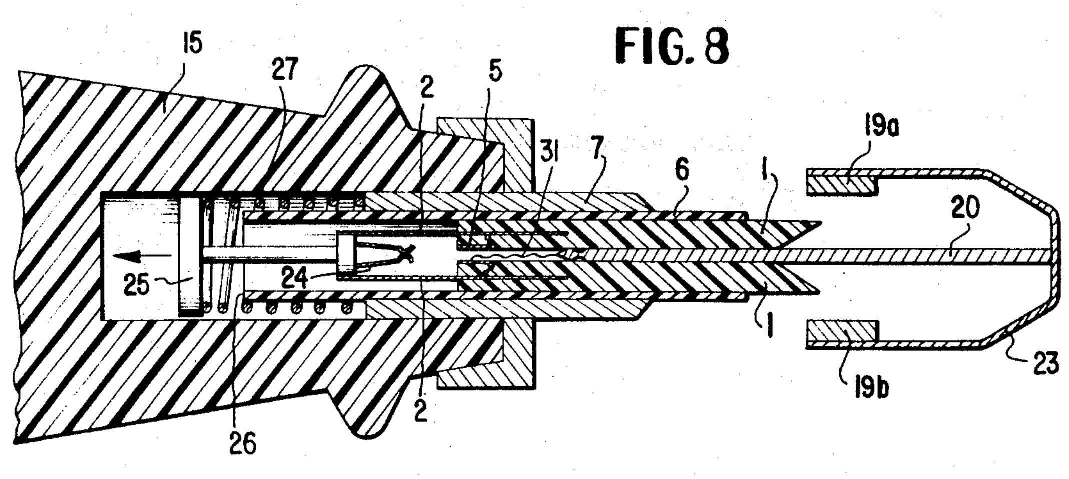

Further clockwise rotation of swinging knife 19 in FIG. 5 causes the arcing blade 20 to tear away from engagement with the arcing contacts 24, because spring plate 25 is held by stop 26. This situation is shown in FIG. 8 where the return spring is snapping spring plate 25, the arcing contacts 24, and the arc-extinguishing jaws back into the housing 6 and insulator 15. The arc 31 has gone over to the arc-resistant pieces 5 and is burning between them and the arc-resistant tip 32 (see FIG. 8) of the arcing blade 20.

Figure 9:
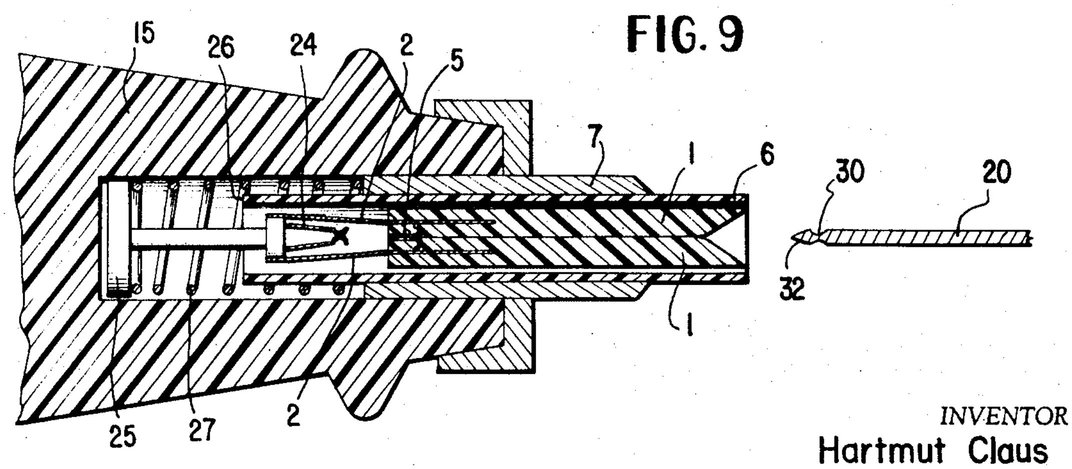
Figure 10:
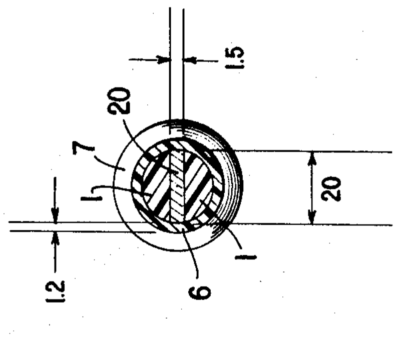
FIG. 10 is a section along the line X—X of FIG. 7.

In the final stage, the arcing blade 20 has left the region between the arc-extinguishing jaws, as shown in FIG. 9. The springs 2 have forced the arc-extinguishing jaws into contact with one another and the arc has been extinguished.

Figure 11:
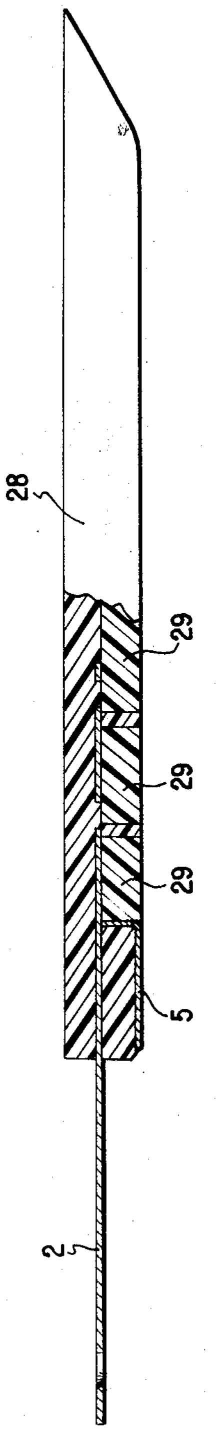
FIG. 11 is a modification of FIG. 2.
Figure 12:
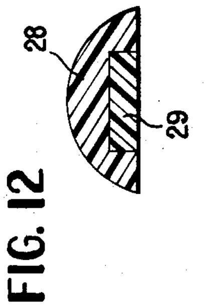
FIG. 12 is a section along the line XII—XII of FIG. 11.

To show the superiority of the plastic of the present invention relative to previously used material for arc-extinguishing jaws, compartive experiments were run. The arc-extinguishing jaws made from old material are illustrated in FIGS. 11 and 12. They have the same dimensions as the arc-extinguishing jaw illustarted in FIGS. 1–4. Material 28 is Plexigum, which is of relatively high mechanical strength and low gas evolving ability as compared with the Delrin material of platelets 29. Impact toughness tests show that arc-extinguishing jaws of the material of the present invention as represented by the above specific example have impact toughness about 50% higher than do the jaws of FIGS. 11 and 12. Moreover, metal parts such as the springs 2, are held considerably better in the material of the present invention as compared with the material of the FIGS. 11 and 12.

The comparative switching tests were run under the following conditions:

| | |
|---|---|
| Breaking current | $I_a$=13 to 2600 amps. |
| Recovery voltage | $U_w$=5.8 to 12.5 kv. |
| Resonant frequency | $f_e$=600 to 2000 cycles/sec. |
| Overshoot factor | $\gamma$=1.05 to 2. |
| Breaking power-capacity | $P$=0.28 to 32 megavolt-amps. |
| Power factor | Cos phi=0.15 to 0.7. |
| Switching-off velocity | $v_a$=1.9 to 2.5 meters/sec. |
| Time between switching | $t$=at least 3 minutes. |

With the old arc-extinguishing jaws of FIGS. 11 and 12, sooting and light premature current conduction upon switching on were noted after 10 switchings. Switching-off was still faultless after 10 switchings.

In contrast, with the plastic of the present invention, as represented by the above specific example, premature current conduction upon switching on was only noted after 90 switchings. After 90 switchings with 750 amp currents, it was also still possible to switch smaller currents at a power factor of 0.15. Similar results are achieved when switching 2600 amps at 5.5 kilovolts. In the experiments, the arc remained burning between 1 and 2.5 hundredths of a second. The arc temperatures were between 10,000 and 15,000° C.; gas evolution began at 300° C.

In comparison of the relative merits of the two types of arc-extinguishing jaws, that made from the plastic of the present invention and that made from Plexigum and Delrin, the process of making the jaws of FIGS. 1–4 is simpler than that required for making the jaws of FIGS. 11 and 12; the mechanical strength of the jaws of FIGS. 1–4 is higher; the securement of the spring 2 in the jaw is better in FIGS. 1–4; there is less sooting with the jaw of FIGS. 1–4; less pitting and material loss due to burning is experienced with the jaw of FIGS. 1–4; and more gas is given off by the jaw of FIGS. 1–4.

The specific Example I given above for the plastic of the present invention is especially valuable for use as the material of arc-extinguishing jaws, because scarcely any carbon arises during its pyrolytic decomposition by an arc. Arc temperatures are so high that it is an impossibility not to experience pyrolytic decomposition of arc-extinguishing jaws. Important is the relative proportions of carbon left in elemental form as soot and carbon going off as gas, for example as carbon monoxide. With the plastic of the present invention, the carbon lost from pyrolytic decomposition is relatively small and that which is lost goes off primarily as gas. If the ratio of aromatic resin to cycloaliphatic resin is increased, the carbon given off as soot increases.

While, under the influence of an arc, the resin parts of the plastic of the present invention evolve gas, gas evolution is increased by the presence of certain fillers—melamine and alumina trihydrate in the above-described specific example. The gases from these fillers act through various physical mechanisms to decrease ion concentration in the arc. This, together with the blowing effect produced by their evolution, acts to extinguish an arc.

Melamine is a nitrogen-containing filler. The nitrogen gases developed by it are marked by especially high electrical insulating properties. It is preferred to use nitrogen gas evolving fillers.

The arc-extinguishing properties of alumina trihydrate rest on its evolution of water vapor. The spontaneous evolution of water vapor brings with it the additional advantage that it prevents the deposition of free particles of elemental carbon on the faces of the arc-extinguishing jaws. In contrast to most other known fillers such as sulfates, oxalates, boric acid, etc., alumina trihydrate improves the ability of the resins to resist leakage currents.

It will be understood that the above description of the present invention is susceptible to various modifications, changes and adaptations, and the same are intended to be comprehended within the meaning and range of equivalents of the appended claims.

I claim:

1. A method for using a castable plastic consisting essentially of a mixture of cycloaliphatic epoxy resin, elastic aromatic epoxy resin, and filler means for increasing gas evolution upon heating by an arc, said mixture consisting essentially of 70 parts by weight of the diglycidic ester of hexahydrophthalic acid, 15 parts by weight of bisphenol epoxy resin, 15 parts by weight poly-(1,2-dimethylethyleneglycol)-diglycidylether, 71 parts by weight of hexahydrophthalic acid anhydride, 30 parts by weight of melamine, and 60 parts by weight alumina trihydrate, comprising the steps of setting said mixture into the shape of an arc-extinguishing jaw of an arc-extinguishing device of an electric switch, and incorporating said jaw into an arc-extinguishing device of an electric switch.

2. The method of claim 1, the two epoxy resins being preheated to about 60 to 70° C. and then mixed together.

References Cited

UNITED STATES PATENTS

| | | | |
|---|---|---|---|
| 3,316,323 | 4/1967 | Wille et al. | 260—830 TW |
| 2,768,264 | 10/1956 | Jones et al. | 260—37 EP X |
| 3,470,128 | 9/1969 | Ernst et al. | 260—37 EP |

OTHER REFERENCES

Lee et al., Handbook of Epoxy Resins, McGraw-Hill, 1967, pp. 13–7 thru 13–18.

Kuhens et al. (inventors), Chem. Abs. 65: 9126f, (eff. date Dec. 16, 1965).

ALLAN LIEBERMAN, Primary Examiner

S. M. PERSON, Assistant Examiner

U.S. Cl. X.R.

260—830 TW